US010940787B1

(12) United States Patent
Woosley

(10) Patent No.: US 10,940,787 B1
(45) Date of Patent: Mar. 9, 2021

(54) LANDSCAPE EQUIPMENT HOLDER

(71) Applicant: Jason W. Woosley, Evansville, IN (US)

(72) Inventor: Jason W. Woosley, Evansville, IN (US)

(*) Notice: Subject to any disclaimer, the term of this patent is extended or adjusted under 35 U.S.C. 154(b) by 0 days.

(21) Appl. No.: 16/793,026

(22) Filed: Feb. 18, 2020

(51) Int. Cl.
*B60P 3/14* (2006.01)
*B60P 7/08* (2006.01)

(52) U.S. Cl.
CPC ............ *B60P 3/14* (2013.01); *B60P 7/0815* (2013.01)

(58) Field of Classification Search
CPC .. B60P 3/14; B60P 7/0815; B60P 7/08; E05B 73/00; A47B 81/005; B60R 11/06
See application file for complete search history.

(56) References Cited

U.S. PATENT DOCUMENTS

| | | | |
|---|---|---|---|
| 3,893,568 A * | 7/1975 | Lile | A47B 81/005 211/49.1 |
| 4,696,405 A * | 9/1987 | Waring | F41A 23/18 16/360 |
| 5,647,489 A * | 7/1997 | Bellis, Jr. | A47B 81/005 211/208 |
| 5,676,257 A * | 10/1997 | Adkins | A47B 81/005 211/4 |
| 5,833,250 A | 11/1998 | Schier et al. | |
| 5,964,358 A | 10/1999 | Hafendorfer et al. | |
| 6,073,781 A * | 6/2000 | Puglisi | B25H 3/04 211/60.1 |
| 6,173,842 B1 * | 1/2001 | Fitzgerald | B60R 9/00 211/4 |
| 6,302,280 B1 * | 10/2001 | Bermes | B60R 9/00 211/175 |
| D459,564 S | 6/2002 | Daniels et al. | |
| 6,409,029 B1 * | 6/2002 | Bermes | A01D 75/004 211/207 |
| 6,619,485 B1 | 9/2003 | Jenkins | |
| 7,168,714 B2 | 1/2007 | Gibbs | |
| 7,644,846 B2 | 1/2010 | Hafendorfer et al. | |
| 7,762,408 B2 * | 7/2010 | Sargent | B60P 3/14 211/85.7 |
| 7,849,557 B1 | 12/2010 | Bellis, Jr. | |
| D638,191 S | 5/2011 | Goth et al. | |
| 8,245,859 B2 | 8/2012 | Sargent | |
| D678,643 S | 3/2013 | Presley | |
| D761,160 S * | 7/2016 | Gilles Duros | D12/101 |
| 2007/0090069 A1 * | 4/2007 | Hafendorfer | B60P 7/08 211/60.1 |
| 2008/0078727 A1 * | 4/2008 | Sargent | E05B 73/00 211/4 |

* cited by examiner

*Primary Examiner* — Patrick D Hawn
(74) *Attorney, Agent, or Firm* — Cramer Patent & Design, PLLC; Aaron R. Cramer

(57) ABSTRACT

A landscape equipment holder includes a "bracket in proximity to a spring-biased pivoting latch. The latch is capable of being removably secured over the bracket to entrap a elongated portion of landscape equipment.

13 Claims, 6 Drawing Sheets

LANDSCAPE EQUIPMENT HOLDER

FIELD OF THE INVENTION

The presently disclosed subject matter is directed to an equipment holder and more specifically to a landscape equipment holder.

BACKGROUND OF THE INVENTION

Professional landscapers rely upon a large quantity of powered tools to perform their daily tasks. In addition to the primary lawnmower, they also utilize trimmers, edgers, and hand powered tools such as brooms and shovels. As these tools are somewhat long and linear, they are often supported in racks from the side of the landscaping trailer where they can be accessed quickly. Typically, these racks just use simple "U"-shaped hooks to hold the tools in place with the aid of gravity. Any bump in the road while traveling to the next jobsite can cause such tools to become lost or damaged, resulting in unwelcome replacement or repair costs.

Some workers may provide extra securement such as bungee cords or rope. However, these securing aids take time to apply and remove, all of which affect the time at a job site and ultimately the bottom line. Accordingly, there exists a need for a means by which long, linear, landscaping tools on a landscaping trailer, can be safely secured, but accessed quickly. The development of the landscape equipment holder fulfills this need.

SUMMARY OF THE INVENTION

The principles of the present invention provide for a landscaping equipment clamping device, comprises one or more clamp assemblies, one or more vertical support members each mounting one of the one or more of the clamp assemblies, each of the one or more of the clamp assemblies includes a "U"-shaped bracket holding a landscaping tool, a locking swing arm swinging ninety degrees, an arm holding bracket seating the locking swing arm and a rearward portion of the locking swing arm which extends through a slide collar and is provided with an upper washer, a spring, and a lower washer.

The one or more of the clamp assemblies and the one or more the vertical support members may be used upon a landscaping trailer. The landscaping trailer may be used to carry tools, equipment and supplies. The landscaping trailer may be provided with a pair of the one or more vertical support members upon which four of the one or more clamp assemblies are mounted. The vertical support member may have a tubular shaped selected from the group consisting of a square tubular shape, a rectangular tubular shape, a solid tubular shape, or a circular tubular shape.

A pair of the landscaping tools may bridge the vertical support member and may each be attached to each of a pair of the one or more clamp assemblies mounted at an equal height. The locking swing arm may be prevented from up and down movement by the spring captured between the upper washer and the lower washer, which may not be overcome without moving the lower washer upward.

In order to open the locking swing arm and to provide for removal or replacement of the landscaping tool from the interior space of the "U-shaped bracket, the user may force the lower washer upward and then grasp a proximal end of the locking swing arm. In order to move the locking swing arm, the user may force the lower washer upward and then grasps the proximal end of the locking swing arm and push on the lower washer along an upward travel path to clear a side flange of the arm holding bracket.

The landscaping equipment clamping device may also comprise pushing up on the lower washer to avoid the side flange of the arm holding bracket, turn the locking swing arm along the ninety-degree travel path, as defined by the slide collar mounted on the spacer. The locking swing arm may maintain a captive state of the landscaping tool on the upper edge, while the "U"-shaped bracket may maintain the captive state on the lower edge and then sides with the vertical support member.

The landscaping equipment clamping device may further comprise the spring between the upper washer and the lower washer which may rotate the locking swing arm along the ninety-degree travel path. The locking swing arm may be prevented from side-to-side movement by the arm holding bracket. The slide collar and the spring allows the locking swing arm to be pushed up by forcing the lower washer upward and rotating the locking swing arm in the ninety-degree travel path. The slide collar may be welded to a spacer which is in turn welded to the vertical support member to allow for movement of the upper washer and the lower washer. The lower washer may be attached to a first end of the locking swing arm via spot welding. The lower washer may also be attached to the first end of the locking swing arm via conventional welding. The landscaping equipment clamping device may include a protective finish to prevent corrosion. A corrosion prevention paint may be the protective finish to prevent corrosion. The landscaping equipment clamping device may be made of carbon steel.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
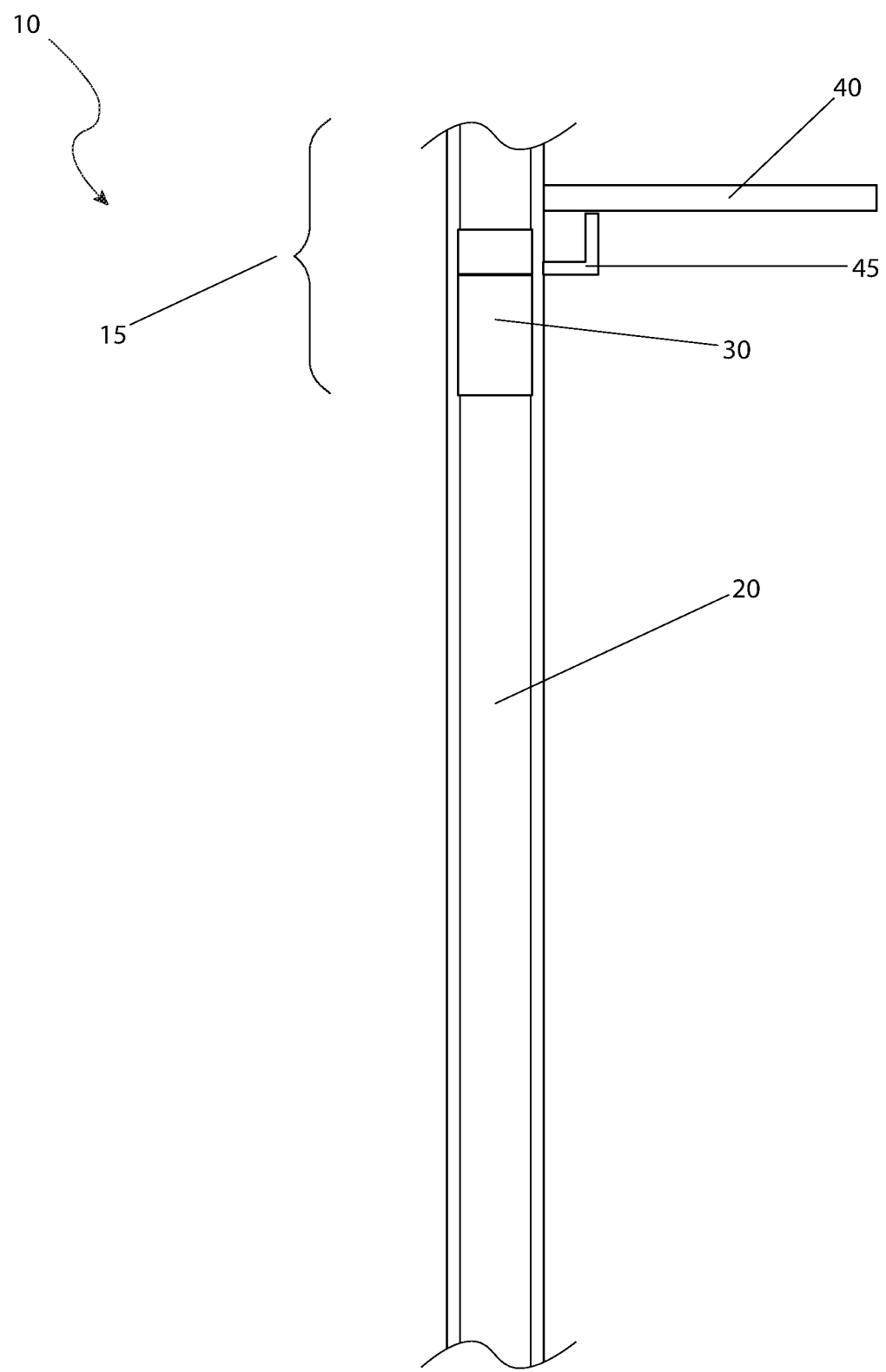
FIG. 1 is a front view of the landscaping equipment clamping device 10, in an open state, according to the preferred embodiment of the present invention.

DESCRIPTIVE KEY 10 landscaping equipment clamping device
15 clamp assembly
20 vertical support member
25 landscaping trailer
30 "U"-shaped bracket
35 landscaping tool
40 locking swing arm
45 arm holding bracket 50 slide collar
55 upper washer
60 spring
65 lower washer
70 interior space
75 spacer
80 proximal end
85 side flange
90 ninety-degree travel path "a"
95 upward travel path "b"

DESCRIPTION OF THE PREFERRED EMBODIMENTS

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the landscaping equipment clamping device 10, according to the preferred embodiment of the present invention is disclosed. The landscaping equipment clamping device 10 (herein also described as the "device") 10, includes one (1) clamp assembly 15 mounted to a vertical support member 20. At least two (2) clamp assemblies 15 would be used for each tool, as will be shown in greater detail herein below. The clamp assemblies 15 and vertical support member 20 are primarily envisioned to be used upon a landscaping trailer 25 (not shown in this figure) but may also be used on a self-standing storage rack as used in a garage, shop or other similar location. The vertical support member 20 may hold multiple clamp assemblies 15 if needed, with proper spacing between each one, in lieu of the single example as shown in FIG. 1. Each clamp assembly 15 has a "U"-shaped bracket 30 that holds the actual landscaping tool 35 (not shown in this figure). Also visible is a locking swing arm 40 and an arm holding bracket 45, whose use and function will be described in greater detail herein below. It is envisioned that all components of the device 10 would be made of carbon steel, that is cut to size and welded together. After manufacture, a suitable protective finish such as paint or plating would be applied to prevent corrosion.

Figure 2:
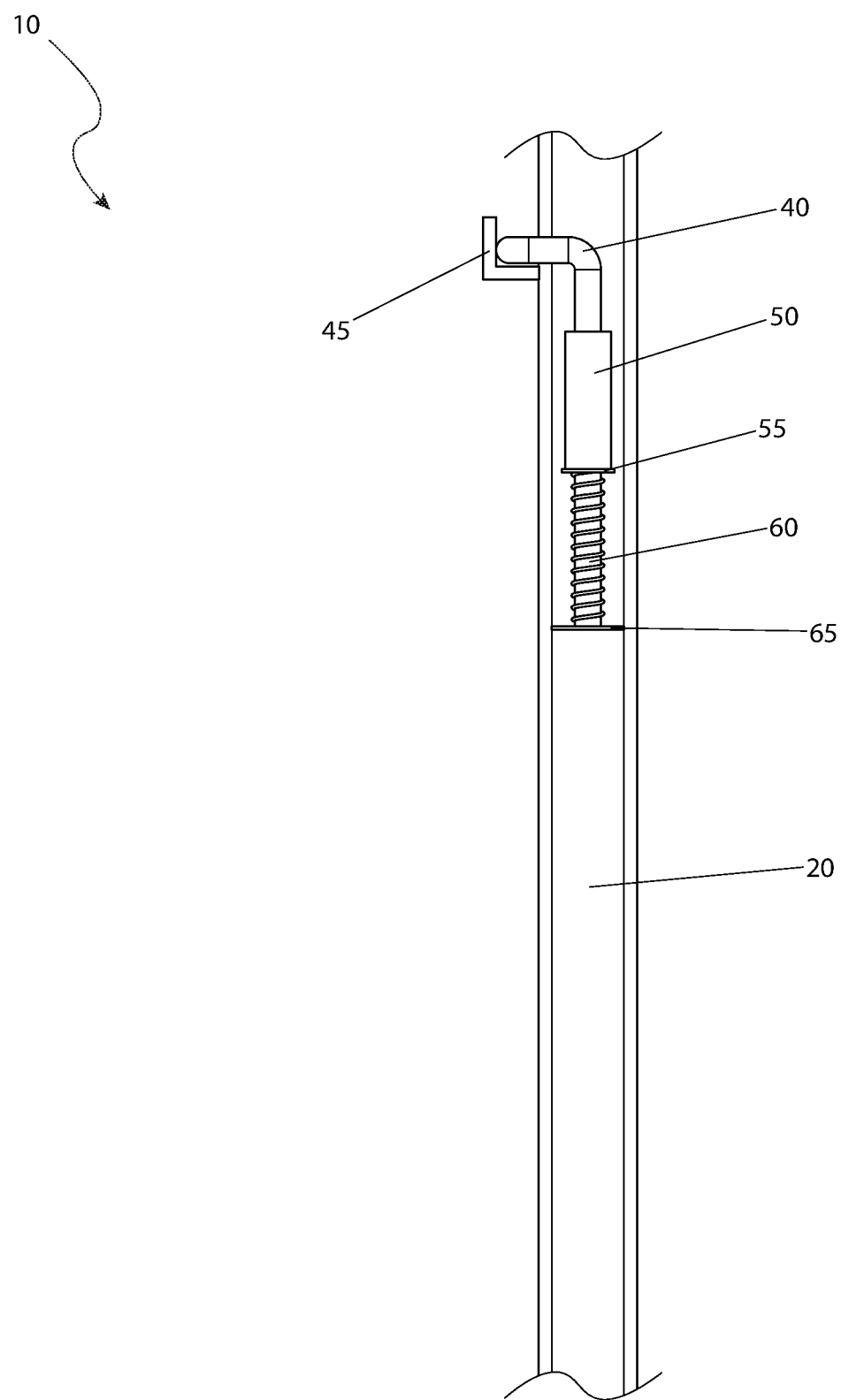
FIG. 2 is a rear view of the landscaping equipment clamping device 10, in a closed state, according to the preferred embodiment of the present invention.

Referring next to FIG. 2, a rear view of the device 10, in a closed state, according to the preferred embodiment of the present invention is depicted. The locking swing arm 40 is now swung ninety degrees (90°) and is seated within the arm holding bracket 45. The rearward portion of the locking swing arm 40 extends through a slide collar 50 and is terminated with an upper washer 55, a spring 60, and a lower washer 65. The lower washer 65 is physically attached to the distal end of the locking swing arm 40 via spot welding or conventional welding. The arrangement of the slide collar 50 in conjunction with the spring 60, allows the locking swing arm 40 to be pushed up by forcing the lower washer 65 upward and rotating the locking swing arm 40 in a ninety-degree travel path 90 to open, as will be further illustrated herein below.

Figure 3:
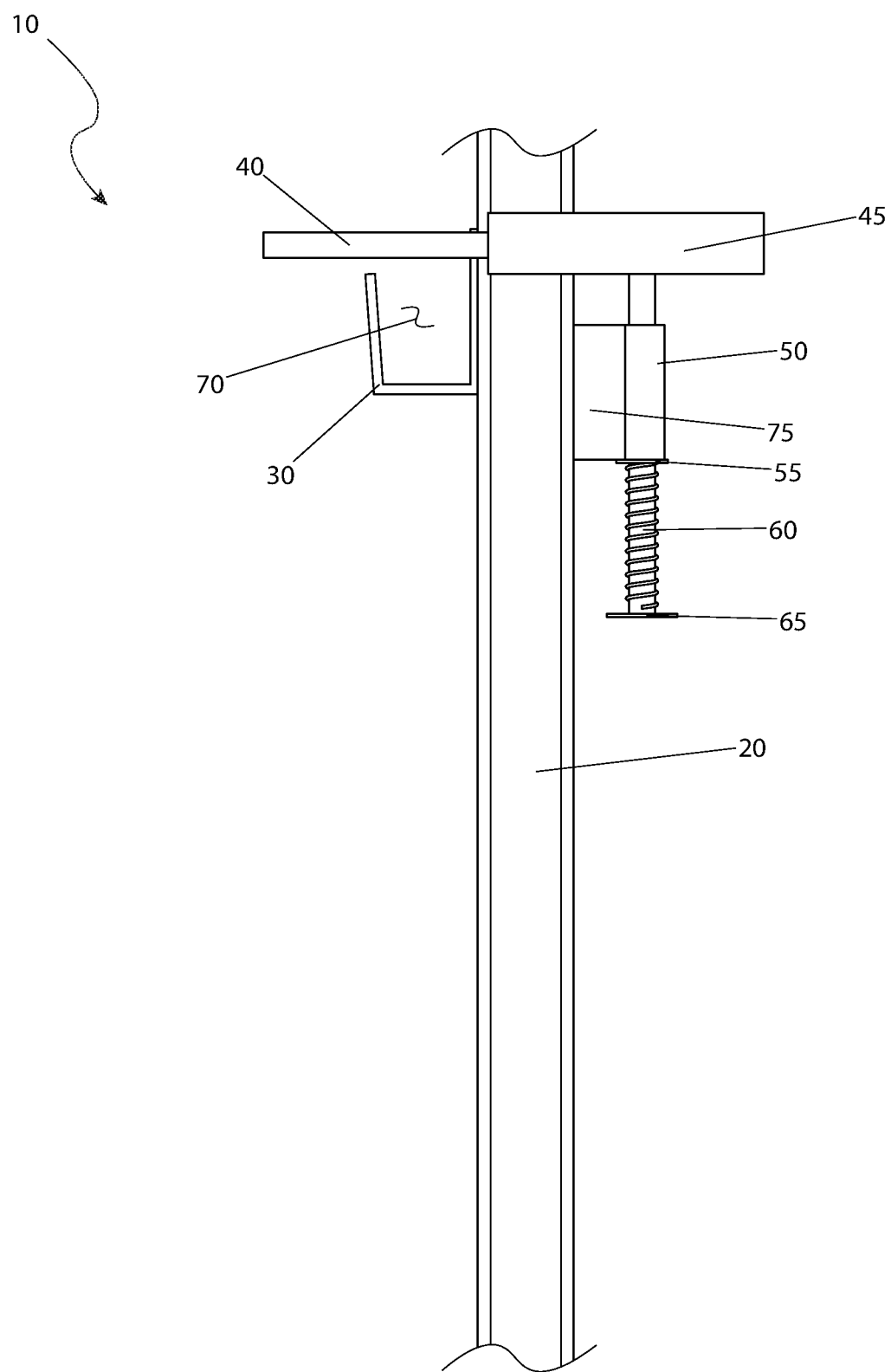
FIG. 3 is a side view of the of the landscaping equipment clamping device 10, in a closed state, according to the preferred embodiment of the present invention.

Referring now to FIG. 3, a side view of the of the device 10, in a closed state, according to the preferred embodiment of the present invention is shown. This view discloses the locking swing arm 40 over the "U"-shaped bracket 30 thus sealing the interior space 70 in a closed or captured position. The locking swing arm 40 is prevented from side-to-side movement by the arm holding bracket 45. Likewise, the locking swing arm 40 is prevented from up and down movement by the spring 60, captured between the upper washer 55 and the lower washer 65, which cannot be overcome without first moving the lower washer 65 upward. The slide collar 50 is welded to a spacer 75 which is in turn welded to the vertical support member 20 to allow for movement of the upper washer 55 and the lower washer 65.

Figure 4:
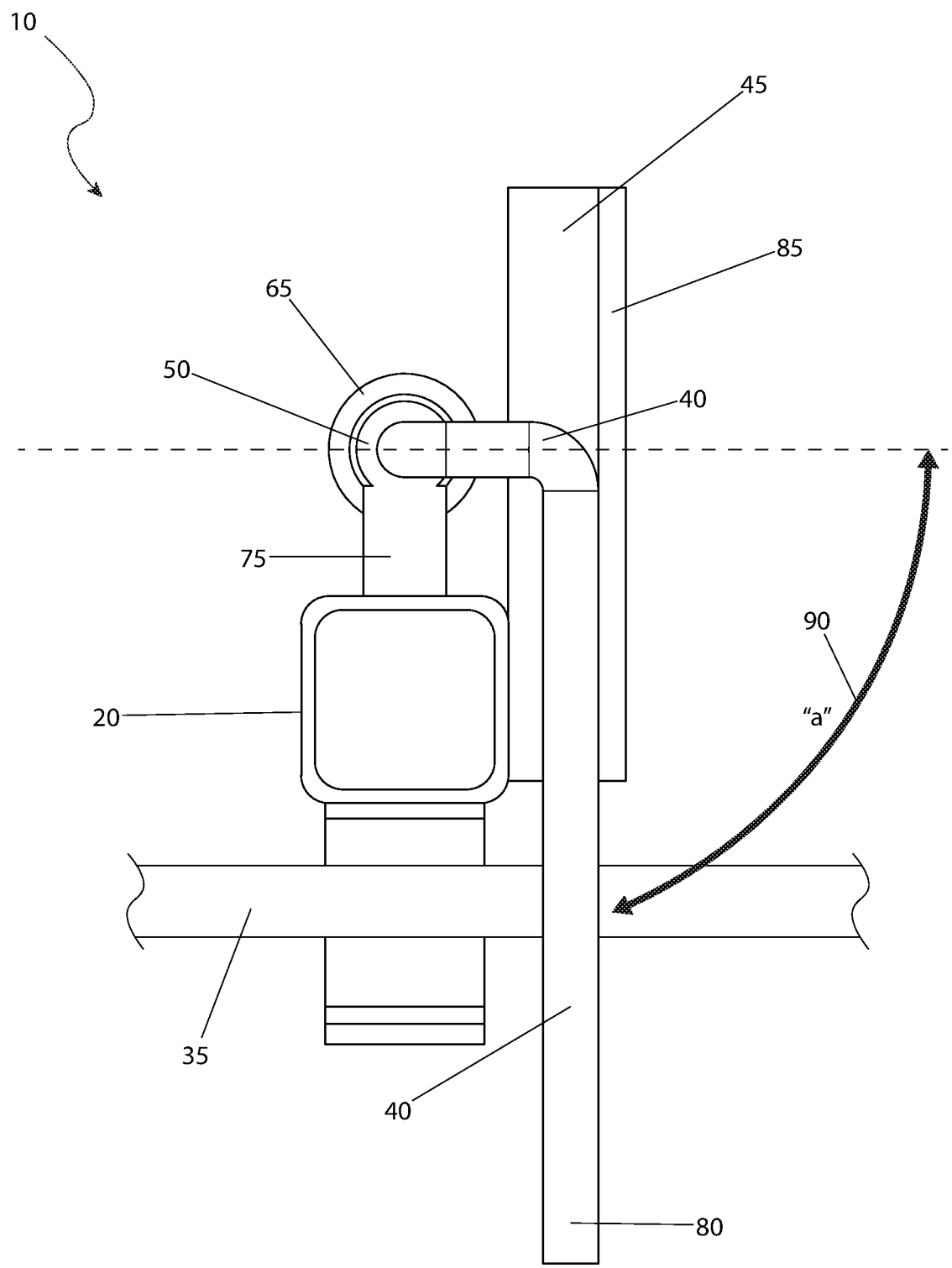
FIG. 4 is a top view of the of the landscaping equipment clamping device 10, in a closed state, according to the preferred embodiment of the present invention.

Referring next to FIG. 4, a top view of the of the device 10, in a closed state, according to the preferred embodiment of the present invention is disclosed. The vertical support member 20 is depicted as square steel tube shape for purposes of illustration. It is noted that the vertical support member 20 can comprise a wide variety of shapes including but not limited to rectangular, solid, circular, and the like. As such, the exact shape, structure, and material of the vertical support member 20 is not intended to be a limiting factor of the present invention. To open the locking swing arm 40, to provide for removal or replacement of the landscaping tool 35 from the interior space 70 of the "U-shaped bracket 30, the user would firstly force the lower washer 65 upward and then grasp the proximal end 80 of the locking swing arm 40, and while pushing up on the lower washer 65 to avoid the side flange 85 of the arm holding bracket 45, turn the locking swing arm 40 along a ninety-degree travel path "a" 90, as defined by the slide collar 50 mounted on the spacer 75.

Figure 5:
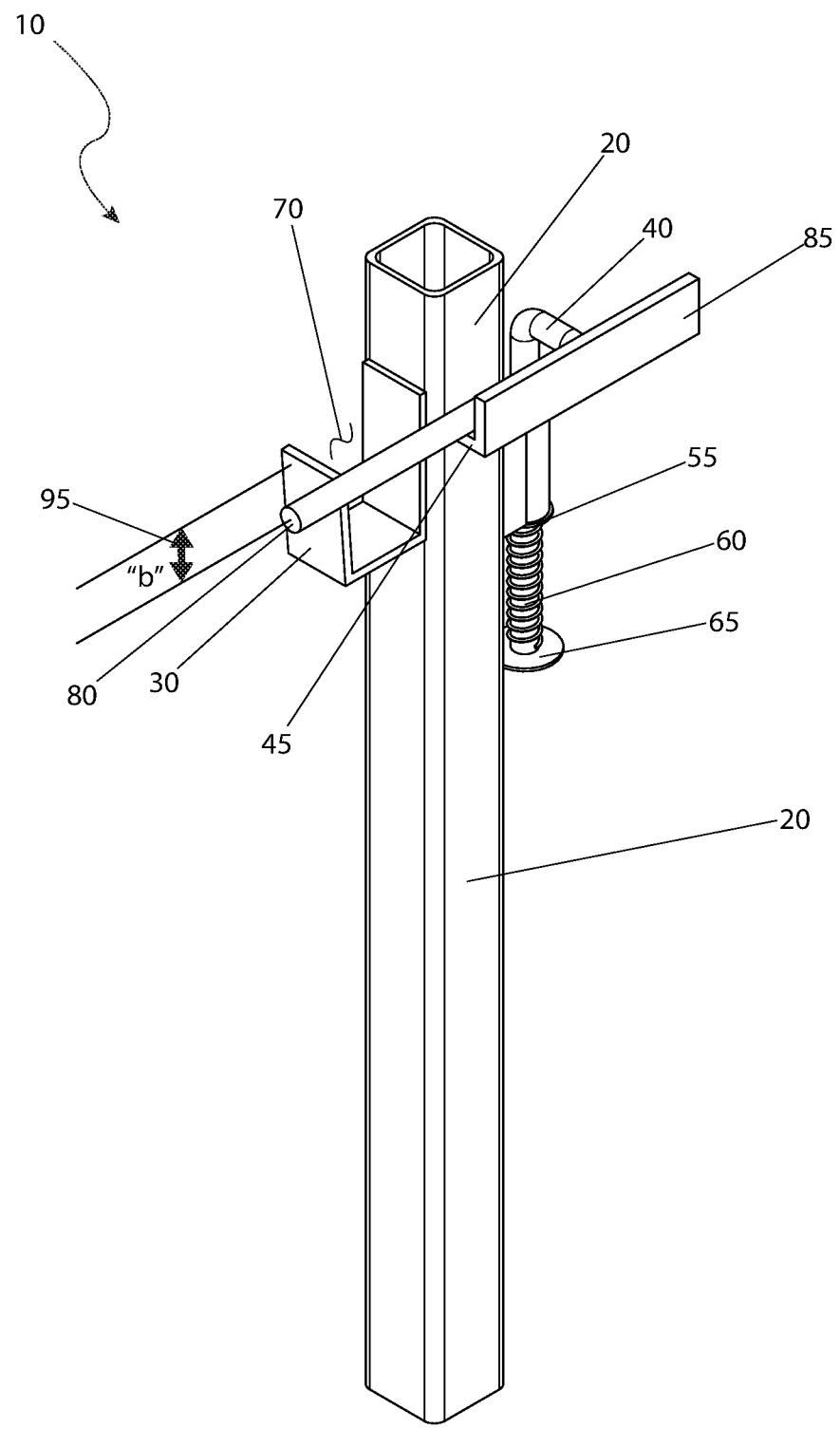
FIG. 5 is a perspective view of the landscaping equipment clamping device 10, according to the preferred embodiment of the present invention; and, FIG. 6 is a pictorial view of the landscaping equipment clamping device 10, shown in a utilized state, according to the preferred embodiment of the present invention.

Referring now to FIG. 5, a perspective view of the device 10, according to the preferred embodiment of the present invention is depicted. The locking swing arm 40 maintains the captive state of the landscaping tool 35 (as shown in FIG. 4) on the upper edge, while the "U"-shaped bracket 30 maintains it on the lower edge and the sides in conjunction with the vertical support member 20. To move the locking swing arm 40, the user must firstly force the lower washer 65 upward and then grasp the proximal end 80 of the locking swing arm 40 and push on the lower washer 65 along an upward travel path "b" 95 to clear the side flange 85 of the arm holding bracket 45. This action compresses the spring 60 between the upper washer 55 and the lower washer 65. At this point in time, the locking swing arm 40 may be rotated along the ninety-degree travel path "a" 90 as shown in FIG. 3.

Figure 6:
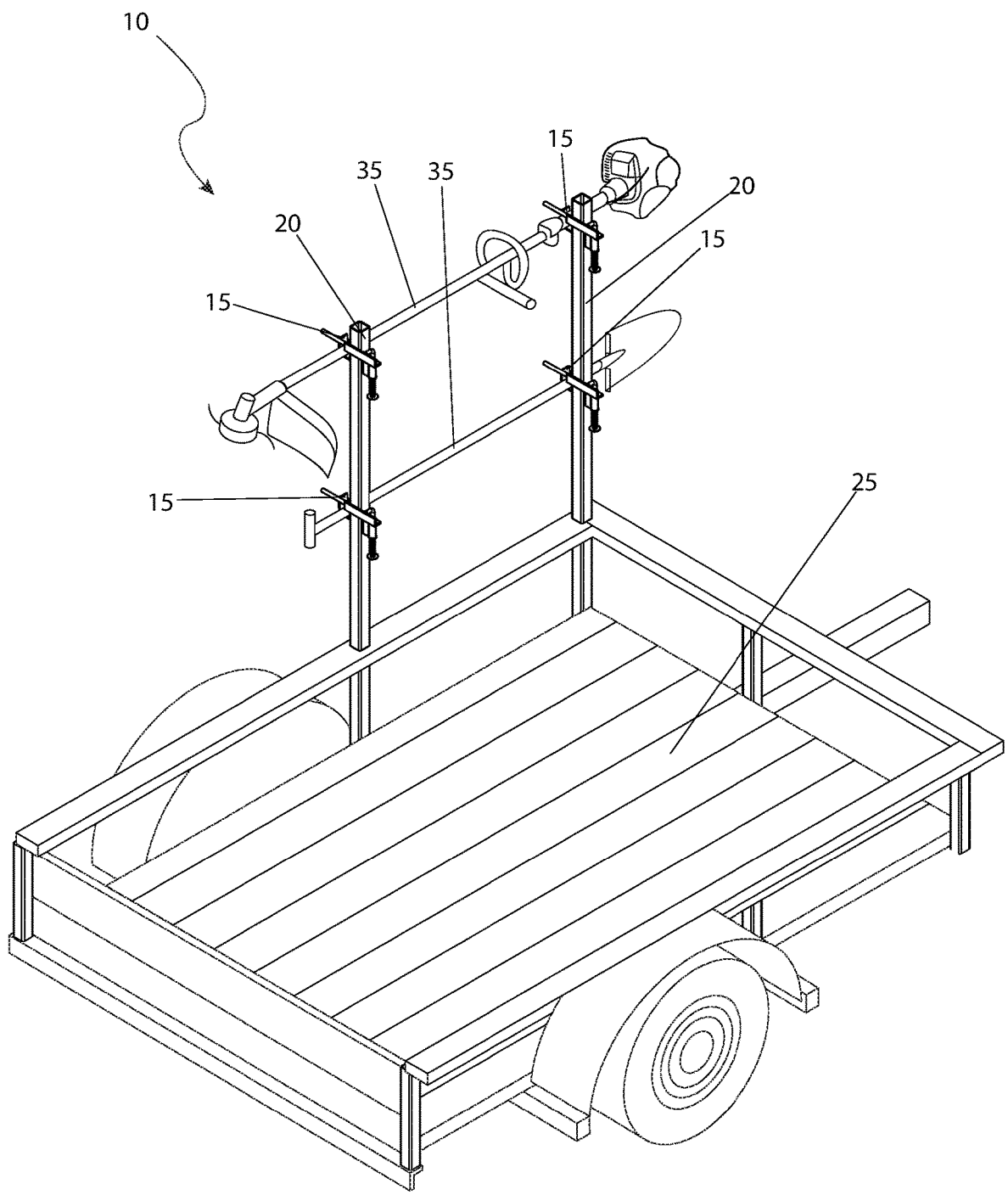

Referring to FIG. 6, a pictorial view of the device 10, shown in a utilized state, according to the preferred embodiment of the present invention is shown. A landscaping trailer 25 commonly used by professional landscapers to carry tools, equipment and supplies is provided with two (2) vertical support member 20 upon which four (4) clamp assemblies 15 (two (2) per vertical support member 20) are mounted. Two (2) landscaping tools 35 are shown bridging the vertical support member 20 and are each attached to two (2) clamp assemblies 15 mounted at similar heights. This arrangement allows for easy access, storage, and removal. As aforementioned described, the clamp assemblies 15 and respective vertical support member 20 of the device 10 can be mounted in a wide variety of locations. The specific location as shown in FIG. 6 is for illustrative purposes only. Other locations around the landscaping trailer 25 would work equally well and as such, the location as shown is not intended to be a limiting factor of the present location. Other locations such as in an enclosed trailer, a truck, a garage, a storage shed, a shop, or the like, can be envisioned by those skilled in the art.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 6. The user would procure the device 10 from conventional procurement channels such as hardware stores, home improvement stores, mechanical supply houses, mail order and internet supply houses and the like. Special attention would be paid to the quantity of clamp assemblies 15 per vertical support member 20, and total quantity of devices 10 needed.

After procurement and prior to utilization, the device 10 would be prepared in the following manner: the device 10 would be installed on a landscaping trailer 25 or other location such as an enclosed trailer, a truck, a garage, a storage shed, a shop, or the like, using the general teachings of FIG. 6. The method of attachment of the vertical support member 20 to the landscaping trailer 25 or storage location is not within the scope of the present invention.

During utilization of the device 10, the following procedure would be initiated: during placement of landscaping tool 35 in the clamp assemblies 15, the locking swing arm 40 would previously be placed in an open position by forcing the lower washer 65 upward until the proximal end 80 along the upward travel path "b" 95 and then turning it along the ninety-degree travel path "a" 90; the landscaping tool 35 would then be placed in two (2) or more the clamp assemblies 15 by setting the landscaping tool 35 in the "U"-shaped bracket 30; the locking swing arm 40 would then be reversed along the ninety-degree travel path "a" 90, whereupon the spring 60, captured between the upper washer 55 and the lower washer 65 will force the locking swing arm 40 downward, reversing the upward travel path "b" 95 and capturing the landscaping tool 35 within the interior space 70, whereupon it remains secure against accidental dislodgement. During removal of the landscaping tool 35, the locking swing arm 40 is once again placed into an open position by forcing the lower washer 65 upward until the proximal end 80 along the upward travel path "b" 95 and then turning it along the ninety-degree travel path "a" 90; the landscaping tool 35 is then lifted from the respective "U"-shaped bracket 30. The removal and placement process then continues indefinitely as needed for usage and subsequent secure storage of the landscaping tool 35.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A landscaping equipment clamping device, comprising:
one or more clamp assemblies;
one or more vertical support members each mounting one of the one or more of the clamp assemblies, each of the one or more of the clamp assemblies includes a U-shaped bracket directly holding a landscaping tool;
a locking swing arm configured for swinging in a ninety degree travel path;
an arm holding bracket seating the locking swing arm; and
a rearward portion of the locking swing arm extending through a slide collar, the rearward portion of the locking swing arm terminates with an upper washer, a spring, and a lower washer;
wherein the locking swing arm is biased against up and down movement by the spring captured between the upper washer and the lower washer, which cannot be overcome without moving the lower washer upward;
wherein to open the locking swing arm and to provide for removal or replacement of the landscaping tool from the interior space of the U-shaped bracket, the lower washer is configured to be forced upward for access to a proximal end of the locking swing arm, such that the locking swing arm is able to clear a side flange of the arm holding bracket and be turned along the ninety-degree travel path, as defined by the slide collar mounted on the spacer;
wherein the locking swing arm maintains a captive state of the landscaping tool when in position above the landscaping tool, while the U-shaped bracket maintains the captive state beneath the landscaping tool and the vertical support member to a side of the landscaping tool; and
wherein the spring between the upper washer and the lower washer, when pushed upward by the lower washer, allows the locking swing arm to rotate along the ninety-degree travel path.

2. The landscaping equipment clamping device according to claim 1, wherein the one or more of the clamp assemblies and the one or more vertical support members are used upon a landscaping trailer.

3. The landscaping equipment clamping device according to claim 2, wherein the landscaping trailer is used to carry tools, equipment and supplies.

4. The landscaping equipment clamping device according to claim 2, wherein the landscaping trailer is provided with a pair of the one or more vertical support members upon which four of the one or more clamp assemblies are mounted.

5. The landscaping equipment clamping device according to claim 1, wherein the vertical support member has a tubular shaped selected from the group consisting of a square tubular shape, a rectangular tubular shape, a solid tubular shape, or a circular tubular shape.

6. The landscaping equipment clamping device according to claim 1, further comprising a pair of the landscaping tools bridging the vertical support member and e-r-e each being attached to each of a pair of the one or more clamp assemblies mounted at an equal height.

7. The landscaping equipment clamping device according to claim 1, wherein when the lower washer is not pressed upward the locking swing arm is prevented from side-to-side movement by the arm holding bracket.

8. The landscaping equipment clamping device according to claim 1, wherein the slide collar and the spring allows the locking swing arm to be pushed up by forcing the lower washer upward and rotating the locking swing arm in the ninety-degree travel path.

9. The landscaping equipment clamping device according to claim 1, wherein the slide collar is adapted to be welded to a spacer which is in turn welded to the vertical support member to allow for movement of the upper washer and the lower washer.

10. The landscaping equipment clamping device according to claim 1, wherein the lower washer is attached to a first end of the locking swing arm via spot welding.

11. The landscaping equipment clamping device according to claim 1, wherein the landscaping equipment clamping device includes a protective finish to prevent corrosion.

12. The landscaping equipment clamping device according to claim 11, wherein a corrosion prevention paint is the protective finish to prevent corrosion.

13. The landscaping equipment clamping device according to claim 1, wherein the landscaping equipment clamping device is made of carbon steel.

\* \* \* \* \*